Sept. 17, 1963 H. J. WILLIAMS ET AL 3,103,785
FUEL FEED AND POWER CONTROL SYSTEM FOR GAS TURBINE ENGINES
Original Filed April 5, 1955 2 Sheets-Sheet 1

INVENTOR.
HOWARD J. WILLIAMS
FRANCIS R. ROGERS
BY BASIL J. RYDER

Robert C. Smith
ATTORNEY

United States Patent Office 3,103,785
Patented Sept. 17, 1963

3,103,785
FUEL FEED AND POWER CONTROL SYSTEM FOR GAS TURBINE ENGINES
Howard J. Williams, Francis R. Rogers, and Basil J. Ryder, South Bend, Ind., assignors to The Bendix Corporation, South Bend, Ind., a corporation of Delaware
Original application Apr. 5, 1955, Ser. No. 499,432. Divided and this application June 29, 1960, Ser. No. 39,683
6 Claims. (Cl. 60—39.28)

This invention relates to a control system for gas turbine engines and more particularly for gas turbine engines adapted for the propulsion of aircraft, such as those now commonly known as turbo-jet and turbo-prop engines. This is a division of U.S. application Serial No. 499,432, filed April 5, 1955.

Two of the foremost problems in the gas turbine engine control art which have been most difficult to satisfactorily solve are the problems of optimizing the rate of acceleration of a gas turbine engine at a predefined limit under all conditions of operation without encountering the phenomenon known as compressor surge or stall, and of accurately and efficiently governing the engine at any selected speed within the speed range thereof and at any altitude and temperature condition.

With respect to the above first mentioned problem, it is now well known that during an acceleration of a gas turbine engine a phenomenon known as compressor surge or stall may be encountered in which the pressure ratio of the compressor exceeds some critical value at any given speed, which usually results in a sudden and drastic reduction of compressor pressure ratio and air flow delivered, and/or in sustained pulsations of these quantities. If such a condition is encountered, the burner temperatures and the vibratory stresses induced in the compressor may become sufficiently high to cause serious damage to the engine unless the condition is alleviated by suitable power control action, such as by an immediate and sharp reduction in the fuel delivery to the engine. In many present day high compression, high efficiency gas turbine engines it has been found that the stall or surge characteristic of the engine compressor requires drastic limiting of the fuel flow supplied to the engine throughout the greater part of the range of acceleration, with a consequent major loss in otherwise available accelerating torque.

It has been previously found that the compressor stall phenomenon becomes most critical in the low pressure rotor stages of the compressor during a transient condition of acceleration, in the low and middle speed ranges, and that the condition of aerodynamic stall in any given stage is directly related to the angle or incidence of attack of the air flowing into that stage of the compressor.

At any given engine speed stall will begin to occur at a given compressor stage if the airflow through that stage is, in effect, throttled, as by a substantial increase in the ratio of pressures thereacross. Concurrent with the throttling effect, there occurs a decrease in the axial airflow velocity relative to the tangential airflow velocity which results in increasing the angle of attack of the airflow vector relative to the blades, thereby reducing the aerodynamic lift induced on the blades by the airflow therethrough and causing a further decrease in the pressure ratio generated by said blades. As the throttling effect on the compressor increases the ratio of axial to tangential flow velocity continues to decrease until aerodynamic lift is minimized and the severity of blade stall in the early stages begins to degenerate the overall compressor ratio. If the condition of stall exists in a sufficiently large number of stages, the entire compressor will stall, resulting in a drastic reduction in airflow and compressor ratio and a consequent serious overtemperature condition at the turbine and violent vibration of the entire engine. Many of the fuel controls now in use on such engines, including the improved control herein disclosed, include a mechanism which schedules the fuel flow during acceleration such that the compressor stall region for the particular engine is avoided.

It has been found that the tendency of the compressor to stall may be alleviated or greatly improved by varying the angles of the stator guide vanes of one or more compressor stages during operation of the engine in the critical ranges of speed in such a manner that the ratio of axial to tangential flow velocity is controlled to vary as required to minimize the stall condition. In this manner the relative velocity between any given rotor stage and the air flowing into said stage may be controlled so as to not exceed some maximum value.

It has been found convenient to control the angles of the stator blades of one or more low pressure compressor stages as a predetermined function of engine speed (N) and theta ($\theta$), where theta is equal to the ratio of compressor inlet absolute total temperature to standard sea level absolute temperature. Guide vane angle control in accordance with a predetermined function of these parameters of engine operation enables the compressor to be throttled to a much greater degree than formerly without stall; in other words at any given critical engine speed and value of theta, a substantially higher compressor pressure ratio than formerly may be generated before stall becomes a problem. The overall effect of proper guide vane angle control enables a given engine to be accelerated through the critical ranges of speed at a substantially higher rate than heretofore, and simplifies the fuel control problem.

We have invented engine control mechanism which is, among other things, adapted to vary the angles of the guide vanes of one or more compressor stages as a predetermined function of certain parameters, e.g. engine speed and theta, in such a manner that the problem of compressor stall is greatly alleviated.

Now referring to the above mentioned second major problem in the gas turbine engine control art, viz; accurate control of engine speed at equilibrium under all conditions of operation, we have provided an improved isochronous engine speed governor which is adapted to accurately and stably maintain, for example, a selected maximum engine operating speed without undershoot or overshoot under all conditions of operation, and which is admirably suited for use with an engine requiring accurate control of engine speed over a very wide range. Our improved governor combines the stability of a so-called proportional type governor with the fixed speed characteristic of an isochronous governor without speed overshoot or undershoot during a governor break following an acceleration of the engine, or during periods when the engine load varies at equilibrium operation, as during a locked throttle climb at maximum speed. These desirable governing characteristics are obtained by including novel means for anticipating a given selected speed during acceleration of the engine, and for damping the reaction time of the governor during periods of engine load change at equilibrium.

In addition to the foregoing, our invention includes an improved maximum compressor pressure limiter device in novel combination with means for varying fuel flow to the engine as a function of compressor discharge pressure, and also includes other generally improved acceleration control mechanism which tends to maximize the overall responsiveness and accurateness of control of gas turbine engines.

It is one of the objects of this invention to provide means for controlling the direction of airflow into one or more compressor stages in such a manner that the condition known as compressor stall is alleviated.

Another object of this invention is to provide an improved speed governor for engines which combines the advantageous features of both the proportional and isochronous type governors; i.e. to provide an improved isochronous governor which will respond promptly to changes in governor setting, which will accurately maintain a selected engine speed irrespective of variations in engine operating conditions, and which will effectively anticipate a new selected engine speed during a transient condition of engine operation so as to avoid overshooting or undershooting the selected speed and so as to promote and insure stability in operation.

Another object of this invention is to provide control means for varying the angularity of compressor stator guide vanes as a function of one or more engine operating parameters.

A further object of this invention is to provide control means operable as a function of certain engine operating parameters for minimizing the stall characteristic of the compressor, combined with the control means for scheduling fuel flow during a transient engine operating condition in such a manner that the rate of engine acceleration tends to be optimized at the controlled compressor stall limit.

Still another object of this invention is to provide improved means for limiting the maximum attainable compressor discharge pressure.

Yet another object of this invention is to provide a novel combination of compressor pressure limiting means with means for continuously controlling fuel flow to the engine as a function of a compressor pressure.

A further object of this invention is to provide an improved gas turbine engine control system in which accelerating fuel flow to the engine is controlled as a predetermined function of engine speed, a temperature which varies with variations in ambient temperature and a compressor pressure, and to coordinate with the accelerating fuel flow control a compressor guide vane control which is responsive to predetermined functions of certain engine operating parameters.

A further object of this invention is to provide an improved gas turbine engine fuel control wherein compressor pressure responsive means and improved governor means combine to control fuel flow during governor cut-off operation and engine equilibrium operation.

A still further object of this invention is to provide a gas turbine engine fuel control wherein an improved engine acceleration control is combined with an improved engine governor control in a novel manner to control the fuel flow to the engine under all operating conditions thereof.

Still another object of this invention is to provide an improved engine speed responsive acceleration fuel control for a gas turbine engine which includes means for generating a signal which varies as a function of the rate of acceleration of the engine.

A further object of this invention is to generally improve the operating mechanism and controls for gas turbine engines.

The foregoing and other objects and advantages will become apparent in view of the following description taken in conjunction with the drawings, wherein.

Figures 1, 5:
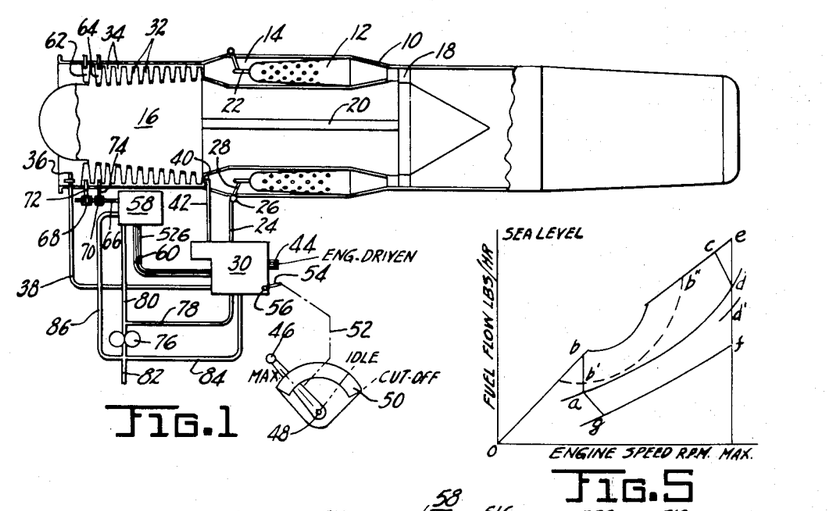
FIGURE 1 is a view in partial sectional elevation of a gas turbine engine and a control system therefor in accordance with the invention.
FIGURE 5 is a curve chart which illustrates the operation of the control system shown in FIGURES 1, 2 and 3.

Referring now to FIGURE 1, a gas turbine engine is generally indicated at 10 and includes a series of annularly disposed combustion chambers 12 mounted in a casing having a header or air intake section 14, and a compressor 16 which is driven by means of a turbine 18 through a drive shaft 20. Each of the combustion chambers is provided with a burner nozzle 22 to which metered fuel is supplied under pressure by way of a conduit 24, a fuel manifold 26 and individual fuel lines 28. A conduit 24 receives metered fuel from a fuel control device, generally indicated at 30, which includes all of the mechanism shown in the control of FIGURE 2. The compressor 16 is of the axial flow type and includes a plurality of bladed rotor stages 32 mounted on the rotor of the compressor, and a plurality of guide vane or stator stages 34 mounted on the compressor housing and cooperating with each adjacent rotor stage for controlling the direction of airflow thereto.

The fuel control 30 contains mechanism adapted to respond to compressor inlet temperature, as sensed by a temperature bulb 36 which is connected to a thermostat in fuel control 30 by a passage 38, compressor discharge static pressure, picked up by a static pressure tube 40 and connected to the fuel control by way of a conduit 42, engine speed, which is transmitted to a splined drive shaft 44 of the control by way of suitable gearing, not shown, between shaft 44 and engine drive shaft 20, and to the position of a pilot's control lever 46, which is mounted for rotation on a shaft 48 in a pilot's control quadrant 50 and which is connected to the fuel control device by means of a linkage 52, a throttle lever 54, and a shaft 56.

A compressor stator or guide vane control unit 58 is connected to control mechanism in the device 30 by a flexible transmission cable 60, and is connected to the guide vanes of compressor stages 62 and 64 by means of a positionally controlled rack 66, pinions 68 and 70, rotatable guide vane pins 72 and 74 which are secured to the stator blades, and mechanism, not shown, which interconnects the various blades of each stage so that a given position of rack 66 effects a corresponding angular position of all of the blades in each of stages 62 and 64.

A pump 76 supplies fuel under pressure to the fuel control device 30 through a conduit 78 and to the guide vane control 58 through a conduit 80, a portion of which fuel may be by-passed back to a pump inlet conduit 82 from fuel control 30 through a conduit 84 and to said pump inlet conduit from the guide vane control 58 through a conduit 86.

Figures 2, 4:
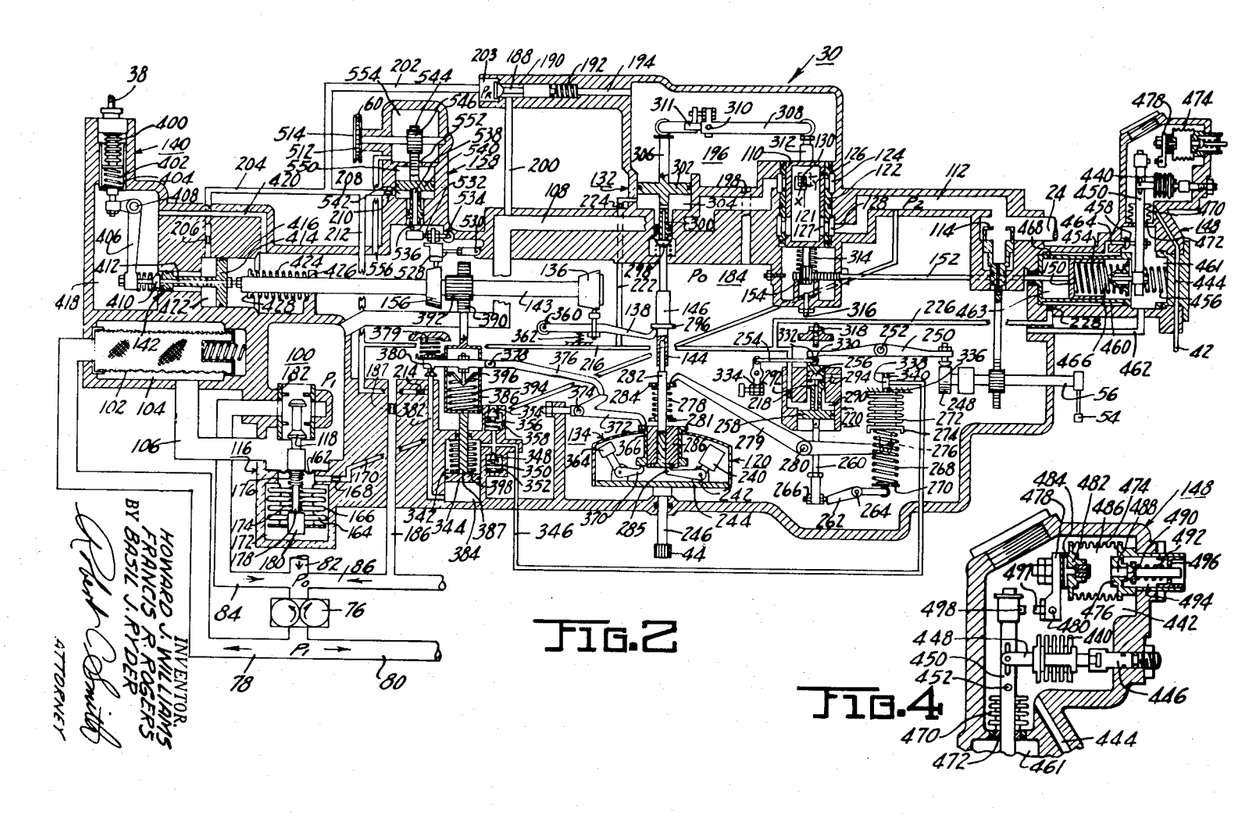
FIGURE 2 is a sectional schematic view of the main control portion of the control system shown in FIGURE 1.
FIGURE 4 is an enlarged view of the compressor pressure limiter mechanism shown in FIGURE 2.

Referring now to FIGURE 2, a by-pass chamber 100 receives unmetered fuel at pressure $P_1$ from the pump discharge conduit 78, a suitable fuel filter 102 mounted in a chamber 104, and a conduit 106. From chamber 100 the total output of pump 76 is divided between a main flow to the engine burners 22 through a conduit 108, a hollow metering valve 110, a conduit 112, a cut-off valve 114, the conduit 24 and manifold 26, and a by-pass flow back to the inlet of pump 76 through a by-pass valve unit 116 and the conduit 84.

The basic fuel flow control valve elements of the control 30 are the metering valve 110, the variable effective area of which actually meters the fuel flow to the engine burners, a by-pass valve 118, which controls a constant fuel pressure differential $P_1$ minus $P_2$ across a metering port 121 of valve 110, and the cut-off valve 114, which is adapted to stop all fuel flow to the engine whenever the engine is shut down.

The fundamental equation of fluid flow is herein employed; i.e. that the flow of a fluid through a restriction will vary in proportion to the area of the restriction and as the square root of the pressure head thereacross. With the metering head $P_1$ minus $P_2$ maintained constant across metering port 121, both transient and steady state fuel flows are varied as required by varying the area of said metering port. The transient limits of fuel flow during an acceleration or deceleration of the engine are obtained by scheduling maximum and minimum metering valve areas as dictated by the utilized engine operating parameters, whereas a speed responsive governor system 120, the speed setting of which is established by the throttle lever 54, controls the metering valve area between said maximum and minimum limits to accurately maintain any given selected steady state engine speed.

Three basic engine operating parameters are utilized to control fuel flow. These are engine speed, compressor inlet temperature and compressor discharge pressure. The control of maximum limited fuel flow during an acceleration is a function of all three parameters. During a deceleration, the minimum limited fuel flow is controlled only by compressor discharge pressure. Steady state operation throughout the operating range from idle to maximum speed is made possible by means of the governor system 120 which is responsive to engine speed alone. Any desired variation in engine power output is accomplished by actuation of pilot's lever 46 and throttle lever 54 which resets the governor.

The metering valve 110 is axially and rotatably actuatable within a sleeve member 122, which connects conduit 108 to conduit 112 through the metering valve by way of an inlet annulus 124, a fixed metering port 126, valve outlet ports 127, and an annular discharge port 128. The valve metering port 121 connects the interior of the valve with the inlet annulus 124 through fixed port 126, with which port 121 variably registers to form an effective metering area 130. $x$ and $y$ dimensions of which are varied by rotational and axial movement, respectively, of valve 110. The $y$ dimension of the metering area 130 may be varied by two separate speed responsive systems, viz., the governor system 120 which is adapted to vary dimension $y$ as an inverse function of engine speed through a power boost travel type servo-mechanism 132, and a speed responsive actuating system 134 which controls the $y$ dimension as a direct function of engine speed by varying the rotational position of a contoured three dimensional acceleration cam 136, which in turn is operatively connected to the metering valve by a cam follower lever stop 138 and servo-mechanism 132. The acceleration cam 136 may be varied in its axial position as a function of compressor inlet temperature by means of a thermostat control 140, an interconnecting power boost travel type servo-mechanism 142, and a cam shaft 143. A telescoping link 144, formed by a governor and acceleration control rod 146, allows the axial position of the metering valve 110 to be controlled by that speed responsive system which demands the least quantity of fuel flow to the engine.

The rotational position, or dimension $x$ of the metering valve is controlled by an actuator unit 148 which responds to compressor discharge pressure and converts a force produced thereby into a travel of a power piston 150 by means of a so-called force type of servo system, which is similar to that utilized in the speed actuating system 134. The power piston 150 is connected to the metering valve 110 by means of a rack and pinion 152 and 154, respectively.

Figure 3:
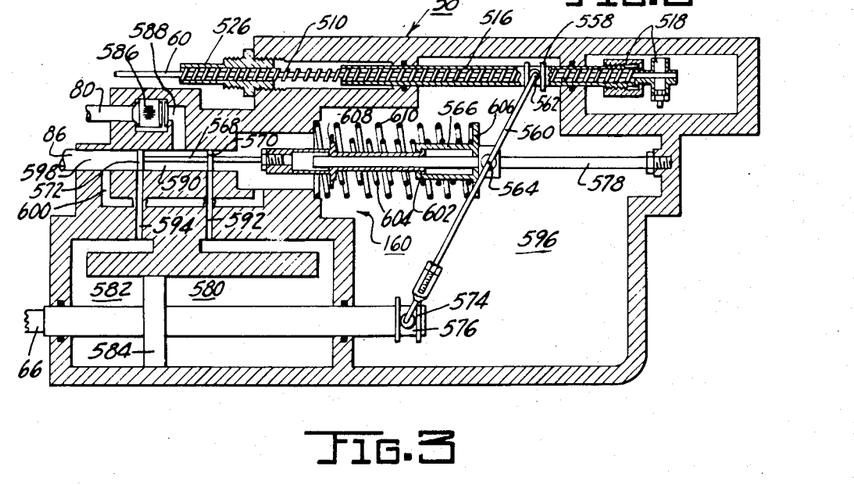
FIGURE 3 is a sectional schematic of the inlet guide vane control portion of the control system shown in FIGURE 1.

The main fuel control device 30, in addition to the above broadly outlined functions, also provides a signal for coordinating the operation of the guide vane control 58 with the operation of the main control by means of a rotatably and axially movable speed and temperature responsive three dimensional cam 156 mounted on the cam shaft 143 and operatively connected to the blades of the compressor stator stages 62 and 64 by means of a servo powered device 158, flexible transmission cable 60, a follow-up type servo mechanism 160 in control 58, rack and rod 66, pinions 68 and 70, and pins 72 and 74. The guide vane control cam 156 is rotated with the cam shaft 143 by the speed actuating system 134 and is axially positioned on said shaft as a function of compressor inlet temperature by thermostat unit 140. The operative connection between guide vane control cam 156 and compressor stator stages 62 and 64 effectively follows the contour of the cam during any change in engine speed or compressor inlet temperature to vary the angular position of the compressor stage blades in accordance therewith.

Referring now more specifically to the various units and systems which together comprise the fuel control 30, and which have been above described in general terms, the constant head by-pass control valve 118 is connected to a movable diaphragm 162 which forms one wall of the chamber 100 and of an expansible chamber 164 formed by a bellows 166 and connected to conduit 112 by a restriction 168 and a passage 170. The bellows 166 is disposed in a fuel pressure chamber 172 and is urged in an expanding direction by an interiorly disposed pressure head setting spring 174 and a stack of temperature responsive bi-metallic disks 176. A valve stem extension 178 terminates at the lower end thereof in a servo valve, not shown, which is movable within a channeled hollow portion of a member 180 which is connected to the lower plate of bellows 166, said arrangement being disclosed and claimed in the copending application of Harry C. Zeisloft, application Serial No. 684,368, filed September 5, 1957 (common assignee). The arrangement is such that the bellows 166 is caused to follow the movements of valve 118 with any momentary variation in the differential pressure $P_1$ minus $P_2$ across diaphragm 162, thereby maintaining the height and load of spring 174 at a constant value irrespective of the position of valve 118, whereby a constant pressure differential is always maintained across the metering valve 110 at any given fuel temperature.

The bi-metallic disks 176 are utilized for the purpose of compensating for variations in the specific gravity of the fuel flowing in the system by causing a variation in the pressure drop across valve 110 as a direct function of the temperature of the fuel flowing. The disks 176 will expand upon an increase in fuel temperature thereby increasing the degree of compression of spring 176 in proportion to the fuel temperature increase which causes a corresponding increase in the pressure drop across valve 110, so that the mass of fluid flowing through any given area of metering port 130 is maintained constant irrespective of variations in the specific gravity of the fuel.

Whenever by-pass valve 118 is open, as shown, fuel will flow from the chamber 100 to pump inlet conduit 84 through a double ported insert member 182. A large case chamber 184, in which a major portion of the operating mechanism of control 30 is housed, is formed within the control housing and is normally filled with fuel at a pressure $P_0'$ which is somewhat higher than the pump inlet pressure $P_0$, being connected to the inlet side of pump 76 by way of a conduit 186 which has a restriction 187 therein.

A constant discharge servo pressure regulator valve 188 is reciprocable within a cylindrical chamber 190, being urged in an opening direction by a spring 192, the spring end of chamber 190 being vented to case chamber 184 by way of a conduit 194, a chamber 196 and a passage 198, and the opposite end of chamber 190 being connected to conduit 108 at pressure $P_1$ by a passage 200. A conduit 202 is adapted to connect a chamber 203 containing fuel at a substantially constant regulated pressure $P_R$, which pressure is at all times proportional to the substantially constant force imposed on valve 188 by spring 192 and pressure $P_0'$, to the plurality of servo mechanisms utilized in control 30, by way of a branch conduit 204 and a restriction 206 connected to the servo mechanism 142 of thermostat unit 140, a branch conduit 208 and a restriction 210 connected to the compressor guide vane signal servo mechanism 158, a branch conduit 212 and a restriction 214 connected to the servo mechanism of the speed actuating system 134, a sub-branch conduit 216 and a restriction 218 connected to a throttle power boost servo mechanism 220, a sub-branch conduit 222 and a restriction 224 connected to the metering valve actuating servo mechanism 132, and a sub-branch conduit 226 and a restriction 228 connected to servo mechanism of the compressor discharge pressure responsive actuator 148. Each of the above noted servo mechanisms is vented to chamber pressure $P_0'$, on the downstream sides thereof in a manner to be hereinafter described. There is thus provided servo differential pressure regulator means for maintaining a constant pressure differential $(P_R-P_0')$ across all servo mechanisms utilized in control 30, which promotes stability and accuracy of operation thereof.

Governor Control System

The governor control system includes a centrifugal force generating weight member 240 pivotally mounted at 242 on a rotatable plate member 244 which is driven at some fixed ratio of engine speed by governor drive shaft 246. The governor throttle lever 54 is operatively connected to weight member 240 by means of the rotatable shaft 56, a governor setting cam 248 mounted on shaft 56 for rotation therewith, a lever 250 fulcrumed at 252, a maximum speed adjustment rod 254, the throttle servo boost mechanism 220 including a half-ball type servo valve 256 and a power piston 258, a link 260, an adjustable lever 262 fulcrumed at 264 and connected to the link 260 at a lever ratio adjustment member 266 and to an adjustable governor spring 268 at a retainer member 270, an engine speed anticipating bellows or spring means 272 having a movable cover plate member 274 abutted by one end of governor spring 268 and connected to a bracket 276 which is in turn connected to a secondary or low droop governor spring 278 by a governor lever 279 fulcrumed at 280, said spring 278 being mounted between a flange 281 fixed on a governor stem 282 and a retainer 284 slidable on stem 282. The governor weight member 240 includes a foot 285 abutting one end of stem 282, which is upwardly actuable with an inner guide spool member 286 against the combined force of springs 268, 272 and 278.

The governor setting cam 248 is contoured to establish a desired steady state schedule between engine speed and the setting of pilot's lever 46. The position of the half-ball servo valve 256 is directly controlled by cam 248 and controls the position of power piston 258, and therefore the degree of compression of the main governor spring 268, by controlling the servo pressure level in a piston chamber 290 formed between the fixed restriction 218 and a passage 292 in the piston; the passage 292 has an effective flow area which is at all times controlled by servo valve 256. Chamber 290 is connected to case chamber 184 by way of the passage 292, the chamber in which valve 256 is mounted, and a passage 294. The servo pressure in chamber 290 is varied between servo regulated pressure $P_R$ in sub-branch conduit 216 and case chamber pressure $P_0'$ and the differential pressure $P_R-P_0'$ is maintained at a constant value by the servo pressure regulator valve 188.

If a higher or lower than existing engine speed is demanded by the pilot, the setting cam 248 will be rotated to actuate the servo valve 256 so as to initially increase or decrease, respectively, the restriction to flow offered by passage 292, which results in an increase or decrease in the pressure level in chamber 290, thereby causing power piston 258 to move downwardly or upwardly, respectively, to increase or decrease the degree of compression of the main governor spring 268. In this manner, the throttle boost servo mechanism 220 enables the governor to be reset with minimum throttle effort on the part of the pilot.

At any given condition of steady state or equilibrium operation of the engine, at which condition the engine torque produced by the fuel flow to the engine is equal to the torque absorbed by the engine, the governor control 120 is in equilibrium and controls dimension $y$ of metering area 130 so as to maintain a constant steady state engine speed. During such a condition of engine operation the force output of the governor weight 240, which is imposed on the governor stem 282 and the control rod 146 through the telescoping or separable link 144, is equal and acts oppositely to the combined force output of bellows 272 and governor springs 268 and 278. At engine equilibrium bellows 272 functions as a fixed rate spring which is combined in series relation with spring 268, the combined spring rate thereof being further combined in series with the rate of spring 278 across governor lever 279. Whenever the governor 120 demands less fuel than the speed actuating acceleration system 134, which is always the case during steady state or governor cut-off operation, the separable link 144 is closed, an acceleration limit stop 296 on control rod 146 is out of contact with the cam follower acceleration limit lever 138, and a half-ball servo valve 298, which is connected to the upper end of rod 146, is positioned to control the effective area of a passage 300.

The power boost servo mechanism 132 is similar to the throttle power boost servo 220, having a power piston 302 positionally controlled by servo valve 298 as a result of the control of servo pressure in a chamber 304. The piston 302 is connected to metering valve 110 by means of a rod 306, a lever 308 having a fulcrum 310 and an adjustable lever arm 311, and a rod 312. A spring 314, urges valve 110 in an opening direction in opposition to the pressure differential which acts across piston 302. The axial position of metering valve 110 during control thereof by the governor is always related to the radial position of weight 240, said weight being connected to control the position of servo valve 298 and piston 302. During engine operation at equilibrium, the force generated by weight 240 is equal to the combined opposing spring force of springs 268, 272 and 278, and the axial position of valve 110 is fixed. The metering area 130 is always controlled during engine operation on governor 120 so that a selected engine speed is maintained as the governor 120 functions to decrease metering area 130 with any increase in engine speed from equilibrium, and to increase the metering area with any decrease in engine speed from equilibrium.

The $y$ dimension of metering port 130 is also controllable by a plurality of valve stop means as follows: The maximum $y$ dimension will vary during an acceleration of the engine in accordance with the contour of acceleration control cam 136, which is adapted to control the position of servo valve 298 and piston 302 in a manner to be hereinafter described; the minimum $y$ dimension of the metering port is fixed during an engine deceleration by an adjustable deceleration stop 316; and the $y$ dimension at engine idle speed is controlled by the governor when the left end of lever 250 is in abutment with an adjustable idle stop member 318.

An end 330 of the maximum speed adjustment rod 254 may be actuated in either direction along an inclined surface 332 of lever 250 by an adjustment lever and screw member 334. The arrangement is such that when lever 250 is in abutment with idle stop 318 the inclined plane 332 is parallel to the bottom face of servo valve 256, and variations in the adjusted position of rod end 330 along plane 332 by member 334 has no effect on the position of servo valve 256. As a result the idle speed setting of the governor 120 is not affected by variations in the position of the maximum speed adjustment rod 254. However, counterclockwise rotation of lever 250 for selecting higher than idle speed settings results in an inclination of plane 332 as shown, so that the adjusted position of servo valve 256, and therefore the governor speed setting at any given position of pilot's lever 46 above engine idle position, is related to the adjusted position of rod end 330 along plane 332. In other words, as rod end 330 is adjusted leftwardly along plane 332 it is apparent that the governor 120 is adjusted to maintain a higher maximum or intermediate speed at a given position of pilot's lever 46 than previously, without the idle speed setting thereof being in any way affected.

The inner fuel filled chamber of governor bellows 272 is connected to case chamber 184 by way of a damping restriction 336, a passage 338 and a restriction 340, and to a fuel chamber 342 formed on one side of a power piston 344 of the acceleration control 134 by a conduit 346 and restriction 336. The rate of upward movement of piston 344 is controlled to vary in proportion to the rate of engine speed increase during an engine acceleration, in a manner to be described. A maximum pressure check valve 348 is held in normally closed position by a spring 350, said valve opening conduit 346 to case chamber 184 through a chamber 352 whenever the pressure in conduit 346 exceeds a predetermined maximum value, whereas a minimum pressure check valve 354 is held in normally closed position by a spring 356 and connects conduit 346 to case chamber 184 through a chamber 358 whenever the pressure in conduit 346 decreases below a predetermined minimum value. Inasmuch as a rate of upward movement of power piston 344 is controlled to be proportional to engine acceleration or rate of change of speed, a consequent rate of volume displacement and fuel pressure build-up in chamber 342, conduit 346 and governor bellows 272 will also vary in proportion to the rate of change of engine speed.

As the pressure in bellows 272 increases during an engine acceleration towards that limited by check valve 348 the bellows expands, thereby compressing spring 268 beyond the selected speed setting thereof, rotating governor lever 279 in a clockwise direction, and relaxing governor spring 278, to effect a temporarily false governor setting at a lower than selected speed. As a result, the force output of governor weight 240 begins to overcome the combined governor spring force at an engine speed which is lower than that selected by an amount which is proportional to the rate of engine acceleration. In this manner, the action of bellows 272 during an acceleration of the engine causes governor cut-off action to begin before selected speed is attained. The sharp reduction in fuel flow to the engine during governor cut-off action causes a corresponding reduction in the rate of acceleration as the engine approaches equilibrium, which results in an immediate deceleration of piston 344 and a bleeding off of the pressure in bellows 272 to case chamber pressure $P_0'$ through restrictions 336 and 340. As bellows chamber pressure decreases to pressure $P_0'$ at a rate determined by the areas of the restrictions 336 and 340, the combined force output of the governor springs is increased at a rate dependent on the rate of bellows pressure decrease, thereby resetting the governor to selected speed during cut-off operation thereof. A proportional characteristic between the rate of fuel flow decrease and the rate of engine speed increase results as governor weight 240 flies outwardly to balance the combined governor spring force at selected speed. The thus induced proportional governing characteristic with anticipation of selected speed insures stability of governor operation without hunting or speed overshoot. Governor anticipation of selected speed with a consequent proportional fuel cut-off characteristic to said speed, is particularly essential during an acceleration to maximum speed, inasmuch as the governor is designed to operate with a substantially isochronous or constant speed characteristic at maximum speed. The governor is designed so that the combined force build-up of the three governor springs 268, 272 and 278 is made substantially equal to the force build-up of governor weight 240 as the radius thereof increases during valve closing movement at maximum speed, thus enabling the valve 110 to move through its entire travel range at maximum speed without any substantial variation in said speed at engine equilibrium. It is apparent that at any given steady speed the pressure in bellows 272 is constant, a change therein occuring only during a change in speed. If the bellows or spring 272 were not adapted to anticipate maximum engine speed and no damping means was provided in the governor, an unstable isochronous governing characteristic would result (inasmuch as no appreciable change in engine speed would be necessary during governing operation to cause a sharp reduction in fuel flow and the value 110 could therefore be actuated throughout its travel range with no change in engine speed). If, on the other hand, the bellows 272 were not adapted to anticipate maximum engine speed but provided governor damping means, a stable isochronous governing characteristic would be realized, but with undesirable engine speed overshoot during governor cut-off operation.

During engine accelerations to speeds less than maximum, the degree of selected speed anticipation by the governor will generally decrease due to a normally lower rate of engine acceleration to low and intermediate speeds and a consequent lesser pressure build-up in bellows 272; however, this relative decrease in the degree of speed anticipation is in effect compensated for by a decreasing rate of change in governor weight force output as said weight flies outwardly against the governor springs to actuate valve 110 towards a minimum flow position during governor cut-off operation to low and intermediate selected speeds. In other words, the governor weight force build-up with a given radius change during governor cut-off operation at intermediate speeds depends in part on increasing engine speed; it is only at maximum speed that the combined governor spring force build-up is designed to equal the governor weight force build-up with a given radius change of weight 240. As lower and lower engine speeds are selected between maximum and idle, therefore, the characteristic mode of operation of the governor mechanism inherently changes from that of an isochronous governor with selected speed anticipation to that of a proportional governor.

*Acceleration Control System*

The three dimensional acceleration control cam 136 is operatively connected to metering valve 110 during an engine acceleration for controlling the y dimension of metering port 130 as a predetermined function of engine speed and compressor inlet temperature, by means of the cam follower lever 138, which is fulcrumed at 360 and maintained in continuous contact with the cam by a spring 362, the stop member 296 on control rod 146, the power boost servo mechanism 132, and lever 308. The surface of cam 136 is peripherally contoured at each axial position thereof as a predetermined function of engine speed and compressor inlet temperature for limiting maximum fuel flow to the engine during acceleration thereof in accordance with a predetermined fuel flow versus engine speed schedule at each compressor inlet temperature.

By a proper selection of the functions of engine speed and compressor inlet temperature, turbine inlet temperature may be maintained within a predetermined maximum allowable value, and fuel flow scheduled so as to avoid compressor stall.

The rotational position of cam 136 is always proportional to existing engine speed, said proportional relation being effected by an engine speed responsive weight 364 of the speed actuating system 134 and the operative connection thereof to the cam 136. The speed weight 364 is mounted for rotation with the plate 244 in a manner similar to governor weight 240, and is operatively connected to cam 136 by an outer spool member 366, which is mounted in slidable relation to the inner governor spool member 286 between a foot member 370 of weight 364 and one end of a lever 372 fulcrumed at 374, a servo valve control lever 376, which abuts the opposite end of lever 372, is fulcrumed at 378, and is urged in a counterclockwise direction by a spring 379, a half-ball servo valve 380, which is mounted on one end of lever 376 for controlling the effective discharge area of a passage 382 and thereby a power piston actuating servo pressure in a chamber 384, the power piston 344, and a reciprocable hollow cylindrical member 386, which is connected to the piston 344 by a rod 387 and to the cam shaft 143 by a rack 390 and a pinion 392. Member 386 mounts a speed system balance spring 394 between one end thereof and a retainer 396, which is connected to lever 376. A return spring 398 is mounted in chamber 342 and urges piston 344 in a downward direction.

During equilibrium operation of the engine, when the governor mechanism 120 controls the axial position of valve 110 and stop 296 is out of contact with acceleration control lever 138, the rotational position of acceleration cam 136 is fixed as a result of a moment force balance between the centrifugal force effect of speed weight 364 about fulcrum 378 and the force of springs 379 and 394 about said fulcrum.

During an engine acceleration control lever 138 is in abutment with stop 296 and permits the y dimension of metering port 130 to increase or be modulated at a rate which is controlled by the peripheral contour of cam 136 at a given compressor inlet temperature, said cam being rotated by the rack and pinion 390 and 392 at a rate which is proportional to the rate of change in engine speed. This latter relation is effected as a result of the increasing force output of speed weight 364 with increasing speed; this force acts on outer spool 366, levers 372 and 376, and servo valve 380 to increase the restriction of passage 382, thereby increasing the servo pressure in chamber 384 to drive power piston 344, cylinder 386 and rack 390 in an upward direction, which compresses spring 394 against retainer 396 and lever 376. A balance will therefore tend to be maintained between the moment force output of speed weight 364 and that of springs 379 and 394 throughout a transient condition in engine speed. In other words, the tendency of speed weight 364 to actuate servo valve 380 in a passage restricting direction is continuously substantially counteracted by the tendency of spring 394 to actuate servo valve 380 in a direction which tends to decrease the restriction of passage 382. The linear and rotational positions of rack 390 and acceleration cam 136, respectively, are therefore always proportional to the existing engine speed. The return spring 398 is ultilized for the purpose of insuring an accurate measurement of engine speed by cam 136 in the low engine speed range; i.e. spring 398 actuates power piston 344 to the lower part of chamber 342 during a deceleration of the engine, thereby relaxing spring 394 to insure the maintenance of a relatively high positive fuel pressure in chamber 384 at low engine speeds when the force output of centrifugal weight 364 is relatively small. This is particularly important in the low speed range between starting and idle; without spring 398 aiding weight 364 in this speed range, servo valve 380 would tend not to generate a sufficiently high servo pressure in chamber 384 to accurately position cam 136 as a function of engine speed.

In considering the fact that the position of piston 344 is always a controlled function or measure of existing engine speed, it becomes apparent that the rate of pressure build-up in chamber 342, conduit 346 and anticipator bellows 272 is always proportional to any given rate change in engine speed, as hereinbefore explained.

The thermostat unit 140 includes a liquid filled bellows 400 which is connected to the temperature sensing element 36 by the liquid filled passage 38; the length of the bellows varies in proportion to variations in the air temperature in the inlet section of the compressor. An operative connection between the bellows 400 and acceleration cam 136 comprises a spring 402 mounted between the bellows and a cup-shaped piston 404, and a lever 406 fulcrumed at 408 and connected to the lower end of piston 404 and to a half-ball servo valve 410 at opposite ends thereof, said servo valve being adapted to control the effective area of a passage 412 which is formed in a power piston 414 of the servo mechanism 142; the power piston is reciprocable in a cylinder 416 and is connected to the acceleration cam by the cam shaft 143 for controlling the axial or transverse position thereof as a function of compressor inlet temperature. The lever 406 is mounted in a chamber 418 which is connected to the case chamber 184 by a passage 420. The power piston 414 forms a chamber 422 on one side thereof which contains fuel at servo pressure; the level of said servo pressure is always related to the area relation between fixed restriction 206 and the variable restriction controlled by servo valve 410, said servo pressure imposing a force on piston 414 which is opposed by a spring 424, mounted between a housing extension 426 and a cam shaft flange 428, and case chamber pressure $P_0'$. As compressor inlet temperature increases, for example, bellows 400 extends to actuate servo valve 410 in a passage restricting direction and to increase the servo pressure in chamber 422 so as to cause power piston 414 to follow the movement of servo valve 410; power piston movement actuates acceleration cam 136 a distance to the right which is proportional to the increase in temperature. The servo mechanism 142 is basically the same as the metering valve servo unit 132 and the throttle setting power boost servo 220.

The acceleration cam 136, as shown, shifts to a smaller contoured cam rise for controlling the position of lever 138, and therefore of metering valve 110, with an increasing compressor inlet temperature. Acceleration through the full speed range at a high compressor inlet temperature, will therefore result in lower rates of fuel feed than those existent at a lower temperature. The cam 136 is so contoured that the engine will accelerate just within maximum turbine temperature and/or compressor stall limits, irrespective of the amount of engine speed or compressor inlet temperature variation.

*Compressor Pressure Actuator and Limiter*

The compressor discharge pressure responsive valve actuator unit 148 includes an evacuated bellows 440 mounted in a chamber 442 which is connected to the discharge side of the compressor 16 by a passage 444 and conduit 42, said bellows being anchored at one end thereof to a member 446 and operatively connected to metering valve 110 by means of a link 448, a lever 450, which is fulcrumed at 452, spring loaded at the lower end thereof by a piston spring 454 and a return spring 456 and connected to a half-ball servo valve 458 at the mid-section thereof, the power piston 150, mounted for reciprocation within a cylinder 460, and the rack and pinion 152 and 154. The springs 454 and 456 are mounted in a chamber 461 which is connected to case chamber 184 by a conduit 462, and said springs urge the piston 150 in a valve closing direction; i.e. in a direction which tends to decrease the x dimension of metering port 130. A servo pressure chamber 463 is formed on one side of piston 150 and contains fuel at a pressure which is intermediate the pressure upstream of restriction 228 and downstream of servo valve 458, said servo valve controlling the effective area of a passage 464 which is connected to regulated pressure passage 226 by an annulus 466 and said chamber 463 being connected to the annulus by a port 468. The lever 450 passes through a sealing bellows 470 which is mounted on the housing at 472 and which is sealingly connected to the lever for insuring against leakage between fuel chamber 461 and air chamber 442.

An increasing force on bellows 440 resulting from an increase in compressor discharge pressure, tends to rotate lever 450 clockwise about fulcrum 452 to increase the restriction of passage 464 and the servo pressure in chamber 463, thereby causing power piston 150 to move rightwardly or in a fuel flow increasing direction to continuously maintain a moment force balance between springs 454 and 456 and bellows 440 about said fulcrum. It is therefore apparent that the position of power piston 150, and therefore the $x$ dimension of metering port 130, is continuously proportional to existing compressor discharge pressure. The return spring 456 has a function similar to that of return spring 398 of the speed actuator system 134; i.e. to insure the generation of a sufficiently high servo pressure in chamber 463 at very low compressor discharge pressures so that accurate control of the rotational position of metering valve 110 may result irrespective of the compressor discharge pressure level.

The servo mechanism utilized in the actuator unit 148 may be termed a force type servo; i.e. the force imposed on bellows 440 is directly converted into a travel or position of power piston 150 with extremely small movement of servo valve 458. This type of servo mechanism is basically similar to that utilized in the speed actuating system 134, wherein the force output of weight 364 is directly converted into a travel of piston 344 with extremely small movement of servo valve 380, and is to be distinguished from the hereinbefore described travel type servo mechanisms 132, 142, and 220, wherein the travel or position of the respective servo valves is converted into a travel or position of the respective power pistons.

The actuator unit 148 is at all times effective to control the $x$ dimension of metering port 130, being coordinated with $y$ dimension controls 134 and 140 during an acceleration of the engine to fix the basic rate of increase in fuel flow along a scheduled fuel flow versus engine speed characteristic, as fixed by acceleration cam 136, and being coordinated with the governor control of the $y$ dimension during governor cut-off and steady state operation to minimize the necessary axial travel of the metering valve during engine speed control by said governor.

A maximum compressor discharge pressure limiter bellows 474 is anchored in chamber 442 on a housing piece 476 and is movably connected by a member 482 to a lever 478 which is fulcrumed at 480, said member containing a restricted passage 484 which connects chamber 442 with a chamber 486 interior the bellows 474. Anchor member 476 contains a passage 488 which is normally closed by a half-ball servo valve 490, said servo valve being urged toward seated position on said member by a spring 492 mounted in a chamber 494 which is vented to the atmosphere through a port 496.

Under all conditions of engine operation, excepting an over-pressure condition, the relationship of the parts associated with limiter bellows 474 is as shown; i.e. servo valve 490 is maintained in seated position on member 476 by spring 492, the pressure in bellows chamber 486 being thereby maintained equal to the compressor pressure in chamber 442. It is therefore apparent that the spring force of bellows 474 tends to rotate lever 478 counterclockwise, thereby maintaining a nib 497 on lever 478 out of contact with an adjacent nib 498 on the upper end of lever 450. The spring 492 is preloaded to maintain servo valve 490 in a closed position up to a predetermined maximum allowable compressor discharge pressure. If the predetermined maximum pressure is exceeded, the resulting force acting on the face of servo valve 490 overcomes spring 492 and vents bellows chamber 486 to the atmosphere through passage 488, chamber 494, and port 496. An air pressure differential is thereby created across the movable end of bellows 474 and the restricted passage 484 which tends to actuate the lever 478 in a clockwise direction and cause contact between nibs 497 and 498, thereby imposing a moment force on lever 450 which varies in proportion to the degree of over-pressure, and which acts counter to the moment force imposed on said lever by bellows 440. It is therefore apparent that an over-pressure condition at the compressor results in an immediate unbalance of moment forces about fulcrum 452 in a direction which causes leftward movement of power piston 150 and a decrease in the $x$ dimension of metering port 130. This in turn reduces fuel flow to the engine which causes a reduction in compressor discharge pressure, thereby eliminating the possibility of damage to the engine because of an over-pressure condition therein. As soon as compressor discharge pressure drops to the predetermined maximum value thereof, servo valve 490 again closes and the limiter bellows 474 returns lever 478 to the position shown.

*Compressor Guide Vane Control*

The compressor guide vane actuator unit 58 (FIGURE 3) is controlled in operation by the three dimensional cam 156 and the travel type servo mechanism 158 (FIGURE 2), being mechanically connected thereto by the flexible transmission cable 60 which has a continuous spiral shaped gear tooth 510 formed thereon meshing at one end thereof with gear teeth 512 of a rotatable push-pull sheave 514, and fixedly connected at the opposite end thereof to a hollow reciprocable tube 516 by a clamping fixture 518. Cable 60 is housed in a tube member 526 between controls 30 and 58. The control cam 156 is rotationally and transversely positioned with cam shaft 143 as a function of engine speed and compressor inlet temperature, respectively, and is operatively connected to cable 60 by a cam follower lever 528 fulcrumed at 530, an adjustable lever ratio member 532 fulcrumed at 534, a half-ball servo valve 536 controlling the degree of restriction of a passage 538 in a power piston 540, and thereby the servo pressure level in a chamber 542 between fixed restriction 210 and case chamber pressure, and a rack and pinion; 544 and 546, respectively, which controls the rotational position of sheave 514. A chamber 550 on the upper side of piston 540 is connected to case chamber 184 through an aperture 552, a chamber 554 and a passage 556. The travel type servo mechanism 158 operates in the same manner as those hereinbefore described, the position of power piston 540 being continuously controlled by servo valve 536 which is positioned in relation to the contour of control cam 156, said contour being designed to vary as a predetermined function of engine speed and theta.

Tube 516 (FIGURE 3) is formed with a spool 558 thereon and is positioned in an axial direction as a function of engine speed and theta in accordance with the contour of control cam 156. A servo control lever 560 is pivotally connected at 562 to the spool 558, at 564 to a spring loaded member 566, which is adapted to control the position of a servo valve 568 having flow control lands 570 and 572, and at 574 to a spool 576 formed on one end of the piston rod and guide vane control rack 66. The spring loaded connecting member 566 is slidable on a guide rod 578 for controlling servo valve 568; the servo valve controls the ingress and egress of pressurized fuel to and from each of chambers 580 and 582 formed on opposite sides of a power piston 584, said chambers being adapted to alternately communicate with inlet conduit 80 and pump return conduit 86 by way of a filter screen 586, a passage 588, an annular chamber 590, servo valve land controlled passages 592 and 594, chambers 596 and 598, which are formed on opposite sides of the valve lands, and a passage 600 which interconnects oppositely disposed pump inlet pressure chambers 596 and 598.

The servo valve connecting member 566 includes a telescoping linkage 602 which is normally maintained in fixed and rigid relation, as shown, by an override spring 604 mounted between flanges 606 and 608 of the connecting member. The spring 604 is preloaded a predetermined amount and will be compressed during leftward feedback movement of servo valve 568, with consequent separation of the telescoping linkage 602, only in the event that some undesired resistance to servo valve movement, such as would be caused by dirt lodging around the periphery of valve lands 570 and/or 572, tends to inhibit proper operation of the actuator unit. If such a resistance to valve movement becomes sufficiently great during leftward feedback movement thereof, the resulting build-up of pressure differential across power piston 584 will overcome the preload of spring 604, thereby separating the telescoping linkage 602 and compressing said spring, which then aids in overcoming said resistance and returning the servo valve to null position. In addition to the override spring 604, a cable loading spring 610 is mounted between the housing and flange 606 for maintaining a load on the input tube shaft 516, thereby insuring that cable 60 will be maintained in tension at all times.

From the above it is apparent that rotational movement of the sheave 514 and the corresponding linear movement of the cable 60 will always vary as a predetermined function of engine speed and compressor inlet temperature (theta), and that a rightward movement cable 60 and of tube shaft 516 causes a corresponding rightward movement of servo valve 568 as lever 560 pivots about connection 574 on spool 576. Such movement of the servo valve connects chamber 580 to high pressure fuel by way of conduit 588, annulus 590 and passage 592, and connects chamber 582 with fuel at pump inlet pressure by way of passage 594, chamber 598 and conduit 86, thereby producing leftward movement of power piston 584 which returns the servo valve to null position as lever 560 pivots about connection 562 on the tube shaft spool 558. Thus, servo valve displacement and resulting feedback movement thereof results in a specific position of the power piston for each flexible transmission cable position, which in turn determines a definite angular position of each of the vanes of compressor stator stages 62 and 64, said piston and vane position being variable as a function of engine speed and compressor inlet temperature, depending on the particular contour of the control cam 156.

It has been found that in gas turbine engines wherein the compressor has a certain stall characteristic, decreasing the throttling effect of the compressor guide vanes with increasing engine speed and compressor inlet temperature or theta will tend to minimize the critical range of engine speed in which compressor stall is a problem. Obviously, different compressor-turbine combinations will result in different compressor stall characteristics, and the guide vane control cam 156 and associated control and actuator mechanism is readily adapted to be utilized with such different combinations to minimize the compressor stall characteristic in any given case. For example, the control cam 156 may be contoured to control the angular position of the compressor guide vanes to vary as some function of $$\frac{r.p.m.}{\sqrt{\theta}}$$

or again, as a predetermined function of r.p.m. $\times$ $\theta$, depending on the particular stall characteristic involved. Also, it is important to understand that engine operating parameters other than engine speed and temperature may be utilized to control the compressor guide vanes so that the compressor stall characteristic may be minimized. For example, compressor guide vane position may be controlled as some function of compressor pressure ratio by utilizing a pressure ratiometer device such as is shown in Patent No. 2,858,700 of Robert G. Rose (common assignee), wherein the displacement or position of a power driven member is continuously controlled to vary as a predetermined function of compressor pressure ratio. If such a member were suitably connected, for example, to servo valve 536 of our guide vane control servo 158, angular positional control of the vanes of compressor stator stages 62 and 64 as a function of compressor pressure ratio would result. Again, angular positional control of the compressor guide vanes could be varied as a function of compressor discharge pressure by suitably connecting power piston 150 of compressor discharge pressure actuator control 148 to servo valve 536.

Summary of Operation

Referring now to the qualitative coordinate plot of fuel flow versus engine speed, as shown on the curve chart of FIGURE 5, assume that the engine 10 has been started and accelerated to operate at an idle condition, as illustrated by point $a$ on a steady state engine operating curve $ad$. In this condition of operation engine speed is controlled by the governor control system 120, pilot's control lever 46 having been placed at the illustrated idle position to rotate throttle lever 54 and setting cam 248 so that speed selecting lever 250 abuts idle stop 318, thereby fixing a position of the power piston 258 of the governor setting servo 220 such that the governor spring 268 is held in a relatively relaxed condition by lever 262, and the effective combined spring force output of governor springs 268, 272 and 278 is exactly balanced by the force output of centrifugal weight 240, thereby resulting in a fixed $y$ dimension of metering port 130. It is apparent that $y$ dimension control of the metering port is effected with telescoping link 144 closed and stop member 296 lifted upwardly away from acceleration control lever 138, inasmuch as the rotational position of acceleration cam 136 is fixed by the speed control system 134 to demand a quantity of fuel flow as indicated at point $b$ on the set level acceleration curve $obce$. As between the governor control system 120 and the acceleration speed control system 134, that one which fixes the lesser $y$ dimension controls. Whenever the governor is holding a fixed engine speed, as at point $a$, it is apparent that the anticipator spring bellows 272 is filled with fuel at a fixed pressure $P_0'$.

In addition to control of the metering port 130 by the governor 120, the $x$ dimension of said port is separately controlled at a fixed width by the compressor pressure responsive actuator unit 148, as hereinbefore described. The $x$ and $y$ dimensions together define a metering port area which, with a constant metering pressure differential maintained thereacross by the by-pass valve unit 116, meters that quantity of fuel to the burner nozzles 22 which maintains the selected engine idle speed at point $a$.

The cut-off valve 114 is maintained in an open position in conduit 24 for all positions of pilot's control lever 46 excepting the indicated cut-off position, at which valve 114 is actuated into a seated position on the adjacent housing section, thereby stopping all fuel flow to the burner nozzles for engine shut-down.

Assume now that the pilot desires to rapidly accelerate the engine from idle speed point $a$ to maximum speed and power point $d$: Such an acceleration is initiated by quickly rotating lever 46 to the position shown in quadrant 50; the governor mechanism instantaneously responds as the setting cam 248 is rotated to a maximum cam rise position, which results in full downward movement of servo valve 256 and power piston 258; in this position lever 262 compresses governor spring 268, bellows 272 and governor spring 278 to a maximum speed selecting condition. The combined effective force output of the three governor springs, then being substantially greater than the force output of governor weight 240, causes downward movement of governor stem 282, rod 146 and power piston 302 and upward or port opening movement of metering valve 110 until control stop 296 contacts acceleration lever 138, in which position further opening of the metering valve is inhibited. The governor stem 282 continues to move downwardly, following contact between stop 296 and lever 138, thereby causing the telescoping link 144 to separate, as shown.

The resulting increase in the $y$ dimension of the metering port 130 causes an immediate increase in fuel flow from idle point *a* to the acceleration limit as indicated at point *b*. The acceleration fuel flow limit indicated at point *b* is scheduled by combining the functions of speed and temperature controlled cams 136 and 156 and of compressor pressure responsive actuator 148. Cam 136 and actuator 148 combine in controlling valve 110 to limit the fuel flow to the valve indicated at point *b*, as determined by the existent engine speed, compressor inlet temperature and compressor discharge pressure conditions, and cam 156 is effective to control the angular position of the compressor guide vanes at said conditions of speed and temperature in such a manner that the angle of attack of the air flowing into the rotor stages of the compressor results in minimizing the tendency of the compressor to stall. Without guide vane control as effected by cam 156, servo mechanism 158 and guide vane actuator unit 58, maximum allowable accelerating fuel flow at idle speed would be as indicated at point *b'* on the dotted compressor stall characteristic curve *b'*, *b''*, which would greatly limit the allowable accelerating torque imposable on the engine; a correspondingly reduced rate at which the engine could be accelerated without encountering stalling of the compressor would result. In other words, the hereinbefore described mode of control of the compressor guide vanes minimizes the effect of the compressor stall characteristic on an engine acceleration fuel flow limit such that a higher rate of fuel flow at any given speed and a higher rate of increase of fuel flow during a change in engine speed can be sustained without encountering compressor stall, thereby greatly increasing the maximum rate at which the engine can be accelerated. In addition, the possibility of encountering compressor stall at any given steady state condition no longer poses a problem.

Inasmuch as the torque available at idle speed, as indicated by the fuel flow rate at point *b*, is substantially greater than the torque absorbed by the engine at said speed, as indicated by the fuel flow rate at point *a*, the engine begins to accelerate along the solid line curve indicated between points *b* and *c*, the dipped portion of said curve being illustrative of the minimized compressor stall characteristic which still exists at the assumed sea level standard conditions of engine operation; the acceleration cam 136 is contoured to control the rate of increase in fuel flow along said curve. The relatively small compressor stall dip in the curve tends to move downwardly and towards the origin with decreasing compressor inlet temperature, cam 136 being contoured to vary the acceleration limit characteristic curve as required with each change in compressor inlet temperature.

The compressor pressure responsive actuator unit 148 functions to establish the general height or level of the acceleration curve as a function of altitude, said curve generally fanning downwardly about the origin with increasing altitude of operation.

The acceleration control portion of applicant's control system is sufficiently versatile to enable it to be readily adapted for use with different engines having widely different operating characteristics. For any given engine, the speed and temperature controlled acceleration cam 136, the compressor pressure responsive actuator 148, both controlling the accelerating area of metering port 130, and the speed and temperature responsive guide vane control system, are so coordinated that accurate and improved acceleration fuel flow limit control is effected under all possible operating conditions of the engine within predetermined wide limits.

As previously discussed in full, acceleration of the engine causes a pressure to be generated in chamber 342, conduit 346 and anticipator bellows 272 which varies as a function of the rate of acceleration. As the rate of acceleration increases, the rate of pressure build-up in bellows 272 increases, and vice versa. As the pressure increases in bellows 272 and said bellows lengthens, along with governor spring 278, the combined spring force decreases an amount which is a function of the pressure increase in the bellows, thereby allowing the governor weight 240 to begin to overcome said combined spring force at a speed lower than that which was selected by the pilot. This condition is illustrated on the acceleration curve at speed point *c*, at which point governor weight 240 begin to overcome the combined governor spring force and actuates stem 282 upwardly, thereby closing telescoping link 144 and actuating metering valve 110, through the medium of the servo mechanism 132, to cut-off fuel flow to the engine along the proportional type governor cut-off curve *cd*. The rate of acceleration decreases rapidly as fuel flow is decreased following the governor break at point *c*; as a result, the rate of upward movement of the power piston 344 is decelerated to zero, thereby allowing a rate of decrease in pressure in bellows 272 which is controlled by the flow control means 336 and 340. As the internal pressure of the bellows decreases towards pressure $P_0'$, the bellows shortens, thereby causing an increasing combined governor spring force and a corresponding increase in engine speed along the governor cut-off curve *cd*. At point *d* the combined governor spring force is as originally selected by the pilot and is balanced by the force output of governor weight 240, thereby resulting in an equilibrium condition of engine operation at maximum speed.

But for the anticipating and subsequent dashpot effect of bellows 272 on the setting of the governor, the engine would accelerate to point *e* on the acceleration curve before the governor began to cut-off fuel flow. Such a mode of operation would cause governor instability because of the fact that the governor weight force build-up during governor cut-off action substantially equals the combined governor spring force build-up, as hereinbefore explained. The selected speed anticipating and dashpot action of the governor control system enables a constant maximum engine speed to be stably maintained irrespective of variations in engine operating conditions. Thus, the disclosed governor system enjoys the advantages of both isochronous and proportional type governors without being subject to the disadvantages of either.

If, while the engine is operating at point *d*, a change in operating conditions should occur, such as with an increase in altitude, the equilibrium point shifts downwardly along curve *edf* to a point on a new steady state curve; such a new condition is as illustrated at point *d'*. With such a change in operating conditions, the compressor pressure responsive actuator unit 148, sensing a lower compressor discharge pressure with the increase in altitude, would rotate the metering valve 110 in a closing direction an amount proportional to the decrease in compressor pressure. At the same time, the governor system would react to axially move the metering valve in a closing direction as a result of the overfueling condition at the new altitude. Without the damping effect of bellows 272 during such a change in operating conditions, the governor system would react to decrease fuel flow along the substantially vertical line *dd'*, which would result in a tendency of the governor to hunt. Bleed 336, however, restricts the ability of the bellows to extend during valve closing movement of weight 240, thereby effectively increasing the combined governor spring force which causes a slight momentary increase in engine speed to stabilize governor action along a curve such as is illustrated between point *d* and *d'*.

A deceleration of the engine from maximum speed point *d* to idle point *a* may be effected by actuating the lever 46 in a clockwise direction to the idle position, which results in a decrease in the combined governor spring force to select speed point *a*. The resulting unbalance between the governor weight and springs causes metering valve 110 to be actuated in a closing direction until pinion 154 is in abutment with deceleration stop 316, at which time the y dimension of the metering port is fixed at its minimum value. This results in a sharp decrease in fuel flow from point d to point f. Engine deceleration proceeds along curve fg as actuator unit 148 rotates the metering valve to decrease dimension x of the metering port with decreasing compressor discharge pressure.

During such a deceleration, the governor control anticipates the selected speed at the point g, inasmuch as power piston 344 moves downwardly at a rate which is proportional to the rate of decrease in engine speed, thereby tending to evacuate anticipator bellows 272 which then effects a temporary combined governor spring force higher than that selected by the pilot; this enables the governor weight to begin to overcome said combined spring force at the speed indicated at point g. The governor then breaks along curve ga as power piston 344 decelerates to a stop and bellows 272 is filled with fuel at pressure $P_s'$.

It should be noted that the compressor guide vane control system is continuously operative to control the angular positions of the guide vanes irrespective of whether the engine is being accelerated, decelerated, or operating at equilibrium.

Although only one embodiment of our invention has been schematically illustrated and described, it will be apparent to those skilled in the art that various changes in the structure and relative arrangement of parts may be made to suit individual requirements without departing from the scope of the invention.

We claim:

1. In a control system for a gas turbine engine having a burner, a conduit for conducting fuel flow to the burner, valve means for controlling the quantity of fuel flowing through said conduit, acceleration fuel scheduling means connected to said valve means for controlling the flow regulating position thereof during an acceleration of the engine in response to an input signal supplied thereto, an engine speed sensor, a hydraulic servomotor connected to said speed sensor and said acceleration scheduling means to supply an amplified input signal therefore that varies in proportion to engine speed, a speed responsive governor device including speed setting means also operatively connected to said valve means for controlling the flow regulating position thereof during equilibrium operation of the engine to maintain a given selected engine speed, pressure signal responsive means connected to said engine governor operative to initiate the governing action during an acceleration of the engine prior to or in anticipation of the attainment of said given selected speed in response to a pressure signal, and pressure rate signal generating means connected to said hydraulic servomotor operative to generate a pressure rate signal that is a function of the rate of change of engine speed, said pressure rate signal generating means being connected to said pressure signal responsive means to supply said pressure rate signal as an actuating pressure signal thereto.

2. In a control system for a gas turbine engine as claimed in claim 1 wherein said pressure signal responsive means comprises an expansible chamber defining means, and means are provided for limiting an extreme value of said signal pressure, whereby the maximum degree of governor selected speed anticipation is limited.

3. In a control system for a gas turbine engine having a burner, a conduit for conducting fuel flow to the burner, valve means for controlling the quantity of fuel flowing through the conduit, a speed responsive governor device connected to said valve means for controlling the flow regulating position thereof during equilibrium operation of the engine, said governor device including an adjustable governor spring positionable to determine a given selected engine speed maintainable through control by said governor device, an expansible chamber defining means connected to said adjustable governor spring operative to initiate governing action prior to or in anticipation of the attainment of said given selected engine speed in response to fluid pressure acting on said expansible chamber, an engine speed responsive servo valve controlled hydraulic power servo piston having a travel proportional to engine speed, a fuid chamber said servo piston operative to define a movable wall for said fluid chamber, a substantially constant pressure fluid reservoir, means restrictively interconnecting said fluid reservoir and said fluid chamber such that the fluid pressure contained in said fluid chamber deviates from said substantially constant pressure in response to movement of said movable wall to generate a fluid pressure signal proportional to the rate of change of engine speed, and means fluidly interconnecting said fluid chamber and said expansible chamber such that the degree of anticipation is proportional to the rate of engine speed change.

4. In a control system for a gas turbine engine as claimed in claim 3 including a limit valve operative to limit the degree of deviation of said fluid pressure rate signal from said substantially constant pressure fluid.

5. In a control system for a gas turbine engine as claimed in claim 3 including a pair of limit valves operative to limit the degree of deviation of said fluid pressure rate signal from said substantially constant pressure fluid, one of said pair of limit valves operative to limit the deviation in a plus direction and the other of said pair of limit valves operative to limit the deviation in a minus direction.

6. In a control system for a gas turbine engine as claimed in claim 3 including means for limiting the degree of response between said fluid reservoir and said fluid chamber.

References Cited in the file of this patent

UNITED STATES PATENTS

| | | |
|---|---|---|
| 2,194,348 | Zoder | Mar. 19, 1940 |
| 2,759,549 | Best | Aug. 21, 1956 |
| 2,855,029 | Eastman | Oct. 7, 1958 |
| 2,906,093 | Robinson | Sept. 29, 1959 |
| 2,941,358 | Kuzmitz | June 21, 1960 |
| 2,960,826 | Hall | Nov. 22, 1960 |
| 2,981,271 | Cowles | Apr. 25, 1961 |